United States Patent
Germe et al.

(10) Patent No.: US 9,065,344 B2
(45) Date of Patent: Jun. 23, 2015

(54) CIRCUIT FOR DETERMINING THE END OF A DEMAGNETIZATION STROKE OF A SWITCHED MODE POWER SUPPLY

(75) Inventors: Michel Germe, Cormelles le Royal (FR); Emeric Uguen, Domjean (FR)

(73) Assignee: NXP B.V., Eindhoven (NL)

( * ) Notice: Subject to any disclaimer, the term of this patent is extended or adjusted under 35 U.S.C. 154(b) by 457 days.

(21) Appl. No.: 13/571,028

(22) Filed: Aug. 9, 2012

(65) Prior Publication Data

US 2013/0208513 A1    Aug. 15, 2013

(30) Foreign Application Priority Data

Aug. 11, 2011  (EP) ..................................... 11290369

(51) Int. Cl.
*H02M 3/335* (2006.01)
*H02M 1/40* (2007.01)

(52) U.S. Cl.
CPC ............ *H02M 3/33515* (2013.01); *H02M 1/40* (2013.01); *H02M 3/33507* (2013.01)

(58) Field of Classification Search
USPC ....................................... 363/21.12, 21.13, 97
See application file for complete search history.

(56) References Cited

U.S. PATENT DOCUMENTS

| | | | |
|---|---|---|---|
| 5,072,353 A * | 12/1991 | Feldtkeller | ...................... 363/20 |
| 6,356,466 B1 | 3/2002 | Smidt et al. | |
| 8,213,203 B2 | 7/2012 | Fei et al. | |
| 8,536,851 B2 | 9/2013 | Lin et al. | |
| 2010/0238689 A1 * | 9/2010 | Fei et al. | ..................... 363/21.16 |
| 2013/0100711 A1 | 4/2013 | Langeslag et al. | |
| 2013/0208513 A1 * | 8/2013 | Germe et al. | ............... 363/21.13 |
| 2014/0029315 A1 * | 1/2014 | Zhang et al. | ............... 363/21.13 |
| 2014/0140109 A1 * | 5/2014 | Valley | ......................... 363/21.17 |
| 2014/0268923 A1 * | 9/2014 | Valley | ......................... 363/21.17 |

FOREIGN PATENT DOCUMENTS

| | | |
|---|---|---|
| CN | 1337084 A | 2/2002 |
| CN | 101552563 A | 10/2009 |
| CN | 201499089 U | 6/2010 |
| CN | 101826796 A | 9/2010 |
| CN | 201733500 U | 2/2011 |

* cited by examiner

*Primary Examiner* — Jeffrey Sterrett (57) ABSTRACT

A circuit for a switched mode power supply having a winding. The circuit comprising: an input configured to receive a winding voltage derived from the winding; a differentiation element configured to differentiate the winding voltage with respect to time in order to determine a derivative signal and compare the derivative signal with a threshold value; a steady state detector configured to set a zero derivative signal when the derivative signal has not exceeded the threshold value for a predetermined period of time, and a logic arrangement configured to identify an end of a demagnetization stroke of the switched mode power supply when the derivative signal crosses a final threshold value after the zero derivative signal has been set.

12 Claims, 8 Drawing Sheets

CIRCUIT FOR DETERMINING THE END OF A DEMAGNETIZATION STROKE OF A SWITCHED MODE POWER SUPPLY

This application claims the priority under 35 U.S.C. §119 OF European patent application no. 11290369.5 filed on Aug. 11, 2011, the contents of which are incorporated herein.

FIELD OF THE INVENTION

The present disclosure relates to the field of circuits for switched mode power supplies, and in particular, although not exclusively to a circuit for determining the end of a demagnetization stroke in the switched mode power supply.

BACKGROUND OF THE INVENTION

The listing or discussion of a prior-published document or any background in the specification should not necessarily be taken as an acknowledgement that the document or background is part of the state of the art or is common general knowledge.

SUMMARY OF INVENTION

According to a first aspect of the invention, there is provided a circuit for a switched mode power supply having a winding, the circuit comprising:

an input configured to receive a winding voltage derived from the winding;

a differentiation element configured to differentiate the winding voltage with respect to time in order to determine a derivative signal and compare the derivative signal with a threshold value;

a steady state detector configured to set a zero derivative signal when the derivative signal has not exceeded the threshold value for a predetermined period of time, and a logic arrangement configured to identify an end of a demagnetization stroke of the switched mode power supply when the derivative signal crosses a final threshold value after the zero derivative signal has been set.

Such a circuit can enable the end of the demagnetization stroke to be accurately determined with a relatively simple circuit implementation. The steady state detector can be considered as providing a variable delay from the start of the demagnetization stroke, during which the end of the demagnetization stroke cannot be identified. This can reduce the likelihood that the end of the demagnetization stroke is incorrectly identified during any ringing that may be present in the winding voltage at the start of the magnetization stroke. The delay applied by the steady state detector can be considered as providing flexible and adaptive operation.

The circuit can accurately determine the duration of the demagnetization period. This in turn can enable the control of the switched mode power supply (SMPS) to be improved because the duration of the demagnetization period may be required to determine the output level of the SMPS.

The switched mode power supply may be a flyback converter. The winding may be a winding at a primary side of a flyback transformer. The winding may be a primary winding or an auxiliary winding of the transformer.

The winding voltage may be the voltage at the drain of a power switch of the flyback converter. The winding voltage may be the voltage across the auxiliary winding or a proportion of the voltage across the auxiliary winding. The drain of the power switch may be coupled to the primary winding of the transformer.

The threshold value may be a negative threshold value. The derivative signal may be considered as exceeding the threshold value when it is less than the negative threshold value. Alternatively, the threshold value may be a positive threshold value. The derivative signal may be considered as exceeding the threshold value when it is greater than the negative threshold value.

In some embodiments, the differentiation element and the steady state detector may be configured to apply a negative threshold value and a positive threshold value. The differentiation element may be further configured to compare the derivative signal with a positive threshold value and a negative threshold value. The steady state detector may be configured to set the zero derivative signal when the derivative signal has been between the negative threshold value and the positive threshold value for a predetermined period of time. This can enable the zero derivative signal to be set accurately and more quickly.

The final threshold value may be the same as the threshold value, the negative threshold value, or the positive threshold value. This can provide a convenient implementation. However, in some embodiments, a final threshold value that is different to the threshold value may be considered as providing advantageous performance.

The differentiation element may be further configured to:

set a positive derivative signal when the derivative signal is greater than a positive threshold value;

reset the positive derivative signal when the derivative signal is less than the positive threshold value;

set a negative derivative signal when the derivative signal is less than a negative threshold value; and reset the negative derivative signal when the derivative signal is greater than the negative threshold value.

The differentiation element may further comprise:

a differentiator configured to differentiate the winding voltage and provide the derivative signal;

a reference voltage source configured to provide a DC reference voltage;

a voltage adder configured to add the DC reference voltage to the derivative signal and provide a derivative reference signal;

a positive differential amplifier/comparator configured to compare the derivative reference signal with a positive threshold voltage derived from the DC reference voltage in order to set a positive derivative signal if the magnitude of the derivative reference signal voltage is greater than the magnitude of the positive threshold voltage and reset the positive derivative signal if the magnitude of the derivative reference signal is less than the magnitude of the positive threshold voltage;

a negative differential amplifier/comparator configured to compare the derivative reference signal with a negative threshold voltage derived from the DC reference voltage in order to set a negative derivative signal if the magnitude of the derivative reference signal voltage is greater than the magnitude of the negative threshold voltage and reset the negative derivative signal if the magnitude of the derivative reference signal is less than the magnitude of the negative threshold voltage.

The steady state detector may comprise:

a timing capacitor that is configured to be charged whilst the derivative signal does not exceed the threshold value and discharged whilst the derivative signal does exceed the threshold value; and a comparator configured to compare the voltage across the timing capacitor with a timing threshold level, wherein the output of the comparator is the zero derivative signal.

The logic arrangement may be configured to:

set an end of demagnetization indicator when the derivative signal crosses the final threshold value after the zero derivative signal has been set; and reset the end of demagnetization indicator upon expiry of a delay interval after the end of demagnetization indicator is set.

The setting and subsequent resetting of the demagnetization period after a delay interval can produce a pulse indicative of the end of the demagnetization stroke.

The logic arrangement may be configured to:

receive the zero derivative signal and provide a delayed zero derivative signal;

perform a logical AND operation on the negative derivative signal and the delayed zero derivative signal in order to generate an end of demagnetization indicator (308, 408).

There may be provided a controller for controlling a switch in a switched mode power supply. The controller may be configured to:

determine a total period of a switching cycle;

determine the start of a demagnetization period;

identify the end of demagnetization period using any circuit disclosed herein;

determine a duration of the demagnetization period;

calculate an output current in accordance with:

the duration of the total period of the switching cycle, a peak current flowing through the winding; and the duration of the demagnetization period; and activate the switch for a subsequent switching cycle in accordance with the calculated output current.

Determining when to activate the switch may comprise setting the duration of the on-time of the switch, thereby setting the duration of a magnetization period of a subsequent power cycle in accordance with the calculated output current. Determining when to activate the switch may comprise setting the switching frequency of the switch, thereby setting duration between magnetization periods of subsequent power cycles in accordance with the calculated output current.

The switch may be a transistor. The switch may be a field effect transistor. The controller may activate the switch by applying a potential to the gate of the field effect transistor. The drain of the field effect transistor may be coupled to a terminal of the winding of the SMPS.

According to a further aspect, there is provided a method of operating a circuit for a switched mode power supply having a winding, the method comprising:

receiving a winding voltage derived from the winding;

differentiating the winding voltage with respect to time in order to determine a derivative signal;

comparing the derivative signal with a threshold value;

setting a zero derivative signal when the derivative signal has not exceeded the threshold value for a predetermined interval of time;

identifying an end of a demagnetization stroke of the switched mode power supply when the derivative signal crosses a final threshold value after the zero derivative signal has been set.

According to a further aspect, there is provided a method for controlling a switch in a switched mode power supply comprising a winding, the method comprising:

determining a total period of a switching cycle;

determining the start of a demagnetization period;

identifying an end of the demagnetization stroke using any method disclosed herein;

calculating an output current over the total period in accordance with:

the duration of the total period of the switching cycle, a peak current flowing through the winding; and the duration of the demagnetization period; and activating the switch for a subsequent switching cycle in accordance with the calculated output current.

There may be provided a controller for a switched mode power supply comprising any circuit disclosed herein.

There may be provided an integrated circuit comprising any circuit or controller disclosed herein.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

A description is now given, by way of example only, with reference to the accompanying drawings, in which:

FIG. 2b shows schematic profiles of signals in the circuit of FIG. 3a;

DETAILED DESCRIPTION OF THE EMBODIMENTS

Embodiments of the present invention enable improved detection of the moment when the magnetic field in a transformer of an LED driver or a power supply is fully discharged. This can allow improved measurement of the output of an LED driver or power supply and can enable better control of the output current of LED drivers or power supplies. The performance of various embodiments may be unaffected by perturbations in the transformer signals due to parasitic capacitances, leakage currents, etc.

In switched mode power supplies with mains isolation and control at the primary side of a transformer, it can be necessary to sense the output variable to be regulated. For example, output voltage, output current or output power may be regulated to be at a desired level. This regulation is often performed by sensing the output variable, comparing it with a reference value at the secondary side of the transformer and sending an error signal generated from the difference between the output variable and the reference value from the secondary side to the primary side. An example of such a converter 100 is given in FIG. 1.

Figure 1:
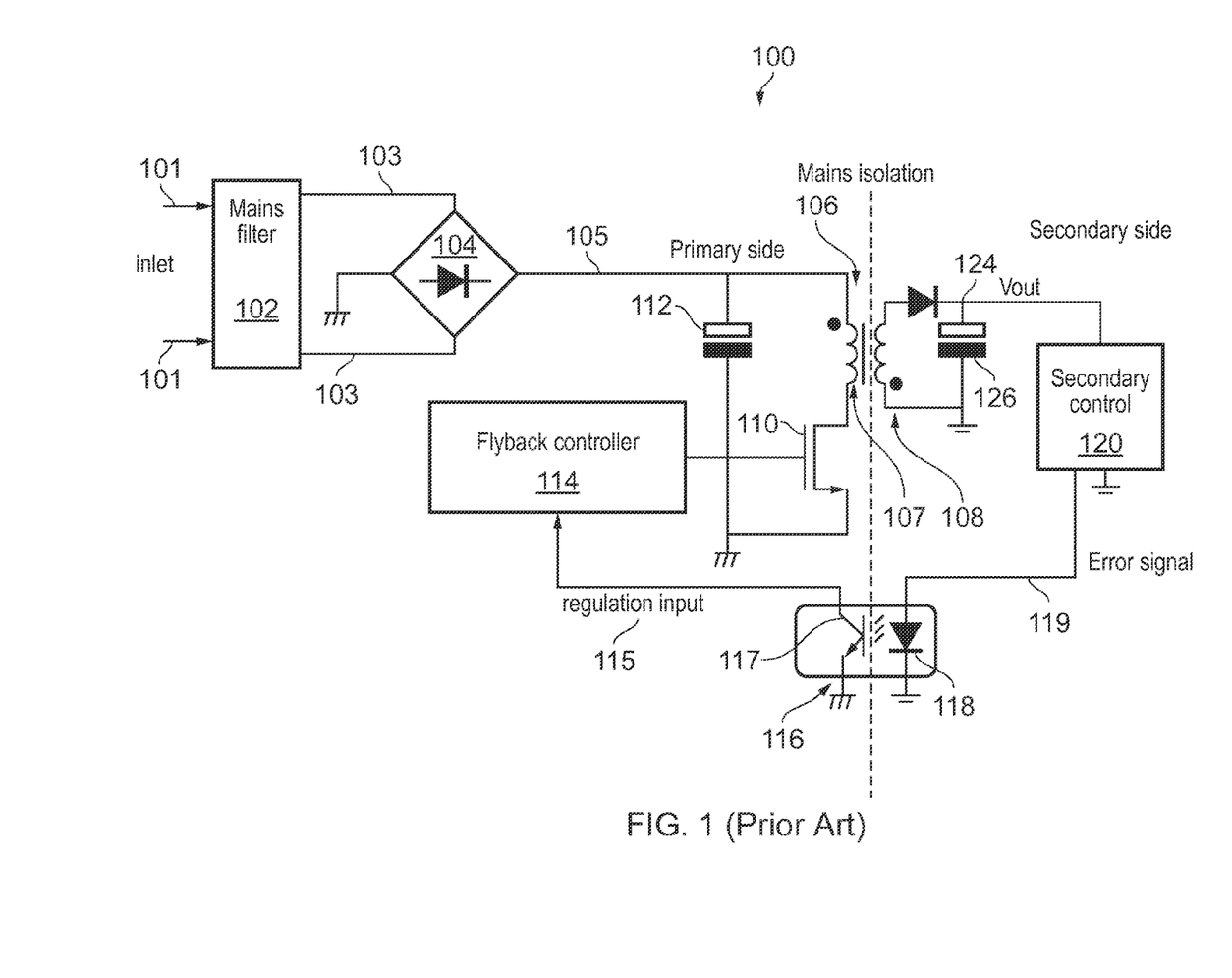
FIG. 1 illustrates a prior art flyback converter.

FIG. 1 illustrates a prior art flyback converter 100 that senses an output variable, generates an error signal 119, and sends the error signal 119 to the primary side of the flyback converter via an opto-coupler 116.

In FIG. 1 an AC power supply signal 101 is provided to a mains filter 102, which filters out high frequency noise from the power supply signal 101. The filtered signal 103 is provided to a bridge rectifier 104 which in this example provides full wave rectification of the filtered AC power supply signal 103. A rectified signal 105 is provided by the bridge rectifier 104 to a first terminal of a primary winding 107 of a transformer 106. A second terminal of the primary winding 107 of the transformer 106 is coupled to ground via the conduction channel of a switch. In this example, the switch is provided as a field effect transistor 110 with the conduction channel being the source-drain path of the transistor 110. The transistor switch 110 may be referred to as a power switch.

The first terminal of the primary winding 107 is also coupled to ground by a capacitor 112. The effect of this capacitor 112 is to smooth the rectified signal 105 supplied to the primary winding.

The gate of the transistor switch 110 is controlled by a flyback controller 114, which varies the gate potential in accordance with a regulation input signal 115 received from the opto-coupler 116. It will be appreciated that the opto-coupler 116 may be used to maintain the electrical isolation between the primary side and the secondary side of the transformer 106.

The opto-coupler 116 has a primary side sensor 117 which provides the regulation input signal 115 to the controller 114. The opto-coupler 116 also has a secondary side emitter 118 that receives an error signal 119. The error signal 119 is determined by a secondary side controller 120, which receives an output signal 122 of the flyback converter from the secondary winding 107.

A first terminal of the secondary winding 108 is coupled to a terminal of an output diode 124 that is configured to allow conventional current flow away from the first terminal of the secondary winding 108. The second terminal of the output diode 124 is coupled to a first plate of an output capacitor 126 (this output capacitor can also be referred to as an elcap). The second plate of the output capacitor 126 is coupled to both a second terminal of the secondary winding 108 and the ground. The output signal 122 is provided at the junction between the output diode 124 and the output capacitor 126.

In some applications, the opto-coupler 116 and secondary side controller arrangement 120 can be too expensive. This may be particularly true in the low power adapter and LED driver markets. Therefore, it may be desirable to provide a switching circuit that does not require an opto-coupler.

Figure 2A:
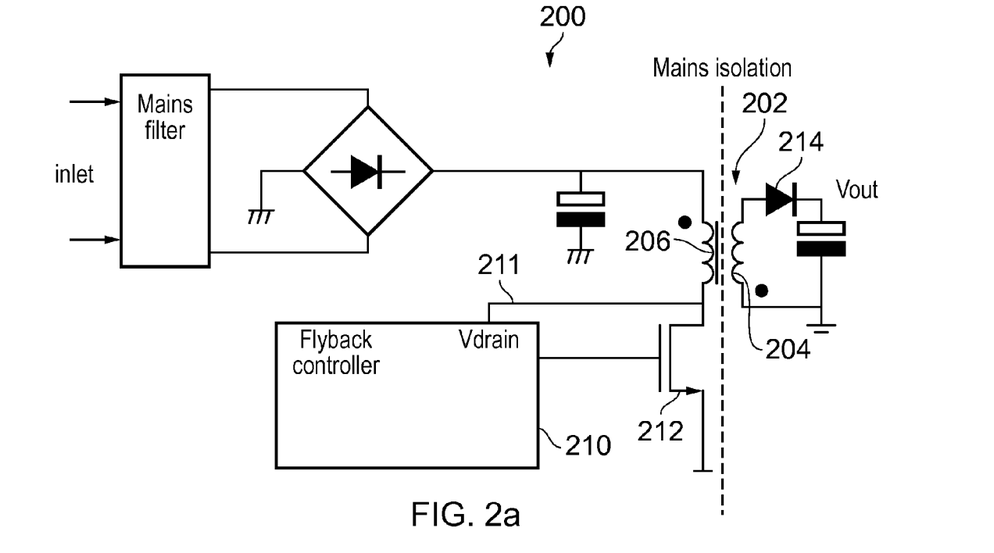
FIG. 2a shows a circuit diagram of an embodiment of the invention.

FIG. 2a illustrates a flyback converter 200 according to an embodiment of the invention. Components of the flyback converter of FIG. 2 that are common to the flyback converter 100 of FIG. 1 will not necessarily be described again in detail here.

The flyback converter 200 includes a flyback controller 210 that receives a Vdrain signal 211 representative of the voltage at the drain of the power switch 212. As will be described in more detail below, the flyback controller 210 can use the Vdrain signal 211 to determine the duration of the secondary stroke, use the duration of the secondary stroke to calculate or measure the output of the converter 200, and hence enable the power switch 212 of the converter 200 to be operated so that a desired output level is accurately achieved.

The flyback converter 200 of FIG. 2a is one example of a switched mode power supply that can be used with embodiments of the invention. The primary winding 206 of the transformer is an example of a winding, and the Vdrain signal 211 is an example of winding voltage that is derived from the primary winding 206 of the transformer.

The construction of the secondary side of the transformer of the converter 200 shown in FIG. 2 is greatly simplified when compared with that shown in FIG. 1. No secondary controller or opto-coupler is required as no feedback is provided from the secondary side of the transformer to the primary side.

Figure 2B:
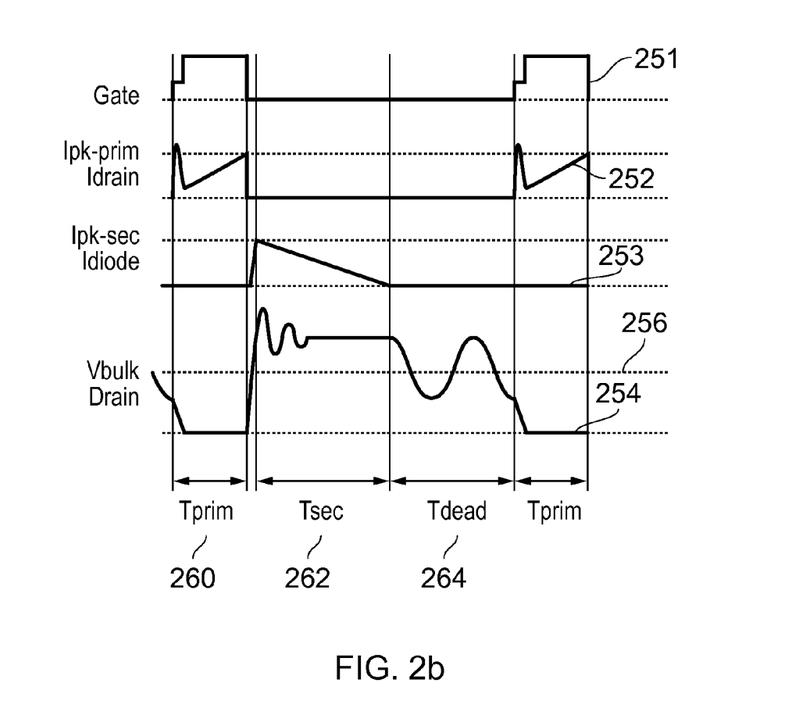

FIG. 2b illustrates profiles of several signals within the circuit of FIG. 2a. Using a flyback converter in boundary conduction mode or discontinuous mode, the current in the secondary circuit is high at the start of the secondary stroke and is significant ringing oscillations may be present. During the secondary stroke the ringing oscillations are dampened and the current flowing in the secondary coil gradually reduces to zero.

A complete switching cycle is shown in FIG. 2b, and consists of three periods; a primary stroke 260 followed by a secondary stroke 262 and a dead period 264. The dead period 264 starts at the end of a secondary stroke 262 and ends at the start of the next primary stroke 260.

The primary stroke (which may also be referred to as a magnetization period, or 'on' period) of the switching circuit can be considered as the period of time between the instant that the power switch is closed and the instant of maximum magnetization current in the inductor. Alternatively, the primary stroke may be considered as the period of time between the instant that the power switch is closed and the time at which the power switch is turned off. The schematic of FIG. 2b shows an interval between the end of the primary stroke and the start of the secondary stroke. This interval can be ignored in many practical applications as it is relatively short. Alternatively, in some examples the interval may be considered to be part of the primary stroke.

A secondary stroke (which may also be referred to as a demagnetization period, or 'off' period) can be considered as the period of time that magnetic energy is flowing to the output 222 up until the magnetization current in the transformer falls to zero.

The top signal 251 in FIG. 2b is the voltage at the gate of the switching transistor 212. This gate signal 251 is high during the primary stroke (by definition). The gate signal 251 is low during all other periods of the switching cycle. When the gate signal 251 transitions from low to high, current starts flowing through the primary winding 207 and the conduction channel of the switching transistor 212.

The primary current 252 is shown in the second graph of FIG. 2b. After an initial surge in the primary current 252, the primary current 252 ramps up linearly from a low level until it reaches a peak value, which is identified in FIG. 2b as Ipk-prim.

The third graph of FIG. 2b shows a curve 253 plotting the current through the output diode 214. It can be seen that this current 253 is zero during the primary stroke 260. At the end of the primary stroke 260, the energy stored in a magnetic field by the primary winding 206 starts to be transferred to the secondary winding 204. This is illustrated in FIG. 2b as the output current 253 rises from zero to a peak value referred to as Ipk-sec in FIG. 2b in the gap between the end of the primary stroke and the start of the secondary stroke. The current delivered to the secondary winding (as measured through the output diode 214) decays from the peak value Ipk-sec to zero over the course of the secondary stroke 262.

The fourth graph of FIG. 2b shows the voltage at the drain of the switching transistor 212. This waveform will be referred to as Vdrain 254. When the gate signal 251 is high in the primary stroke 260, Vdrain 254 is close to zero.

When the gate signal 251 goes low, Vdrain 254 starts to rise. When Vdrain 254 crosses the converter input voltage (which is identified in FIG. 2b with reference 256), the secondary stroke 262 starts. The period of time during which Vdrain 254 rises from zero to the input voltage level represents the gap between the primary and secondary strokes 260, 262.

Vdrain 254 continues to rise at the beginning of the secondary stroke 262. Vdrain 254 reaches a peak value and then starts to oscillate with oscillations that gradually decrease in amplitude. The oscillations eventually decay to have negligible amplitude, and Vdrain 254 then has a relatively constant value up until the end of the secondary stroke 262. Clamping components can be used to dampen these ringing oscillations, as is known in the art and described below with reference to FIG. 8.

Immediately upon expiry of the secondary stroke 262, and up until the next primary stroke 260, a dead period 264 occurs during which Vdrain 254 oscillates.

For a flyback converter, the output current is given by the formula:

$$Iout = \frac{Ipk}{2} * N * \frac{Tsec}{Tprim + Tsec + Tdead}$$

Where:
Iout is the output current,
Ipk is the peak current in the primary winding,
Tprim is the duration of the primary stroke, also referred to as the magnetization period,
Tsec is the duration of the secondary stroke, also referred to as the demagnetization period, and
Tdead is the duration of the dead period (the period between the end of the secondary stroke and the start of the next primary stroke).

The total period of the switching cycle (Tprim+Tsec+Tdead) is equivalent to the chosen switching period, Ts. Where the chosen switching frequency, $$Fs = \frac{1}{Ts}.$$

From the formula expressing Iout above it can be seen that in order to generate an accurate output current, a precise knowledge of the duration of the secondary stroke (Tsec) and the total switching period (Ts=Tprim+Tsec+Tdead) is required.

Prior art implementations may not be able to accurately assess the duration of the secondary stroke (Tsec) using the information available to them. Prior art solutions have used imprecise, unsatisfactory, complicated or inflexible methods of determining the end of the demagnetization period.

Embodiments of the present invention can provide an improved control of the output of a switched mode power supply (SMPS) by more accurately determining Tsec. With this information, the switching transistor can be better controlled by a controller in order to modify the output to a desired level.

One or more embodiments of the present invention can improve the accuracy of the output current of a power supply or LED driver. A variation of less than 5% from the desired value in the output current or output voltage can be achieved, in some examples without requiring a complicated or expensive implantation.

Tsec can be evaluated by determining the start and end of the demagnetization period. The start of the demagnetization period is known to the controller as this occurs when Vdrain crosses the input voltage level.

Figure 3:
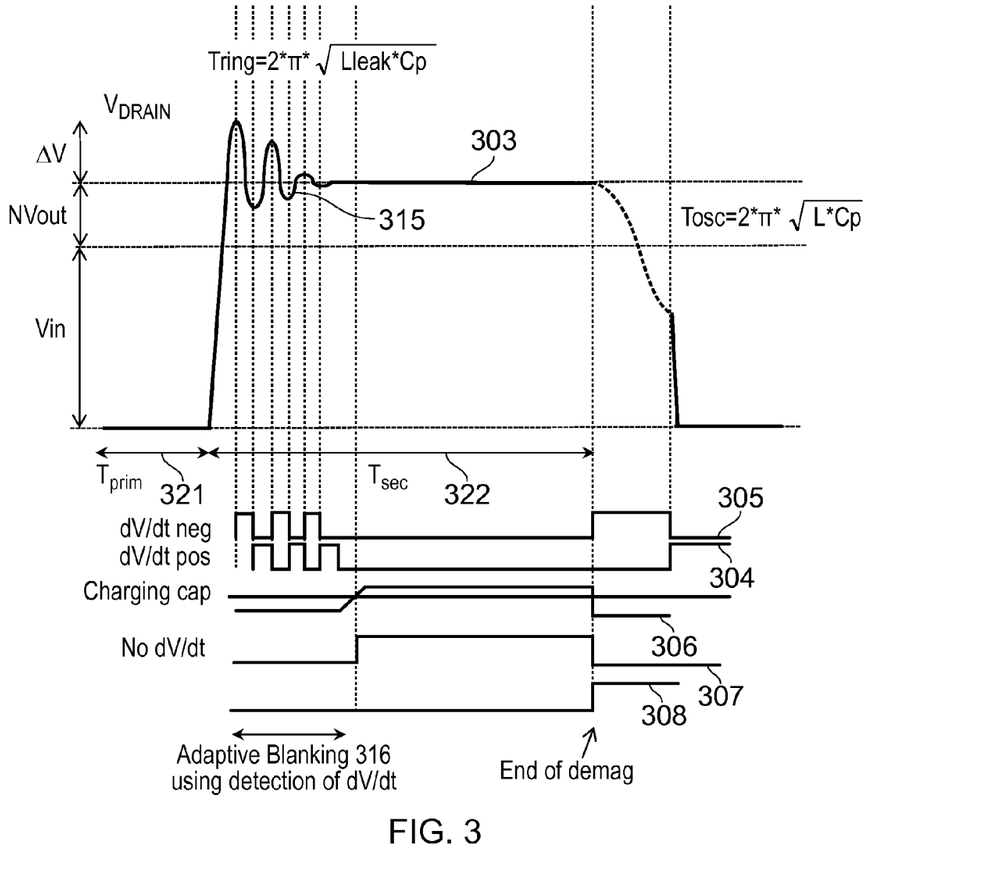
FIG. 3 shows schematically control signals for operating a flyback converter in accordance with the present invention.

FIG. 3 shows graphically a voltage at the drain of the power switch (this voltage will be referred to as Vdrain 303). A number of control signals 304-308 are shown below Vdrain 303, illustrating operation in accordance with an embodiment of the present invention.

Figure 4:
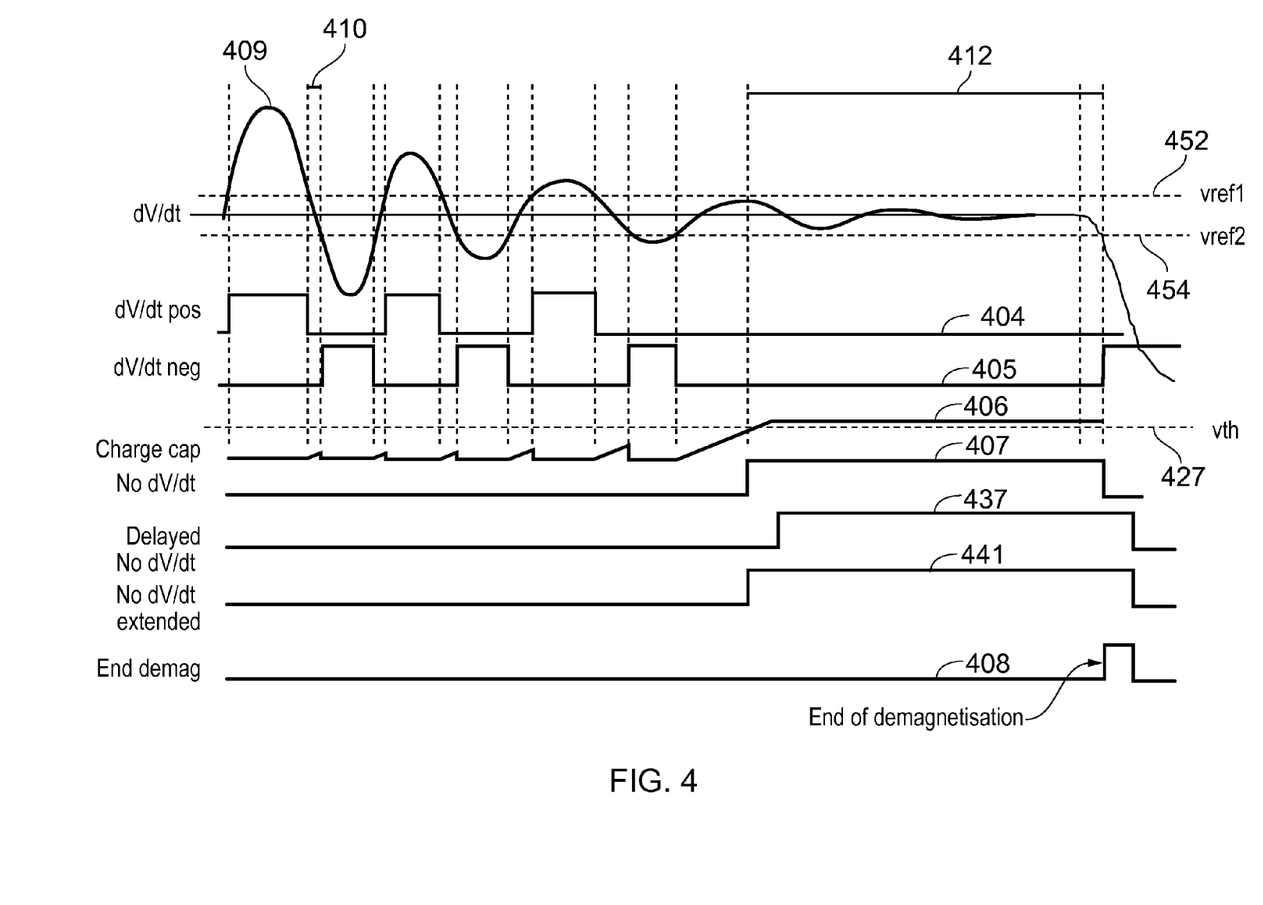
FIG. 4 shows schematically further details of control signals generated by a circuit in accordance with the present invention.

FIG. 4 shows further details of control signals according to an embodiment of the invention together with the differential of Vdrain with respect to time plotted as curve 409 (as opposed to the absolute value of Vdrain 303 that is shown in FIG. 3).

Figure 5:
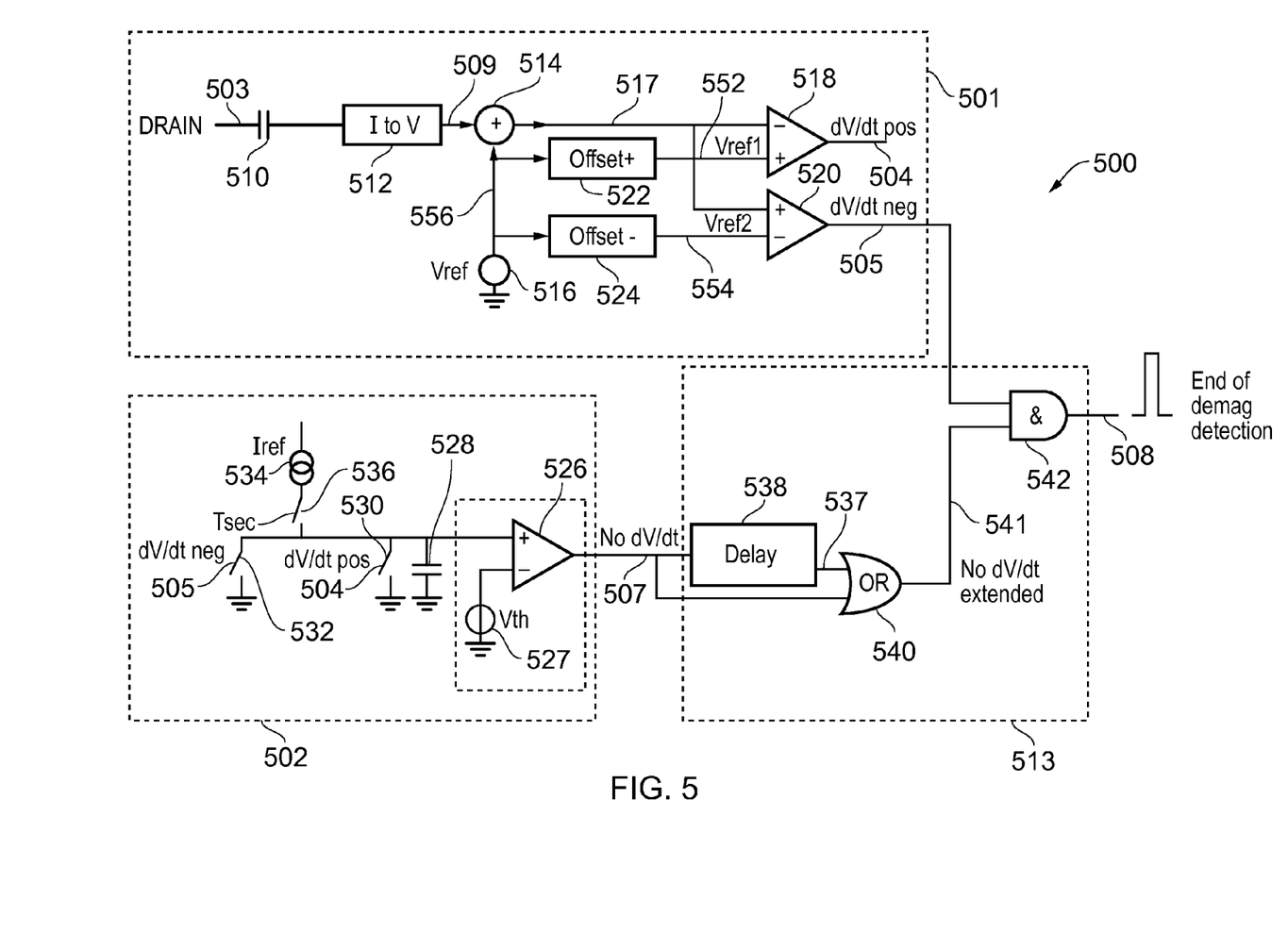
FIG. 5 illustrates a circuit in accordance with the present invention.

FIG. 5 shows a circuit 500 for use with a controller in accordance with an embodiment of the present invention in order to generate the control signals shown in FIGS. 4 and 5. The circuit 500 may be provided within the controller 210 shown in FIG. 2.

Circuit 500 comprises three sections: a differentiation element 501, a steady state detector 502 and a logic arrangement 513. The differentiation element 501 and steady state detector 502 provide signals to the logic arrangement 513 which outputs an end of demag detection pulse 508.

The differentiation element 501 receives an input voltage Vdrain 503, indicative of the voltage at the drain of a switching transistor in a flyback converter. An example Vdrain signal is shown with reference 303 in FIG. 3. Alternative embodiments of the circuit 500 of FIG. 5 may receive a voltage from an auxiliary winding of a transformer of the flyback converter at input voltage 503 instead of the Vdrain signal. The voltage across the auxiliary winding may reflect the Vdrain signal. The voltage across the auxiliary winding could be processed by a differentiation element 501 in a similar way to the Vdrain signal shown in FIG. 5.

The differentiation element 501 calculates the derivative of the Vdrain signal 503 with respect to time, and this derivative signal will be referred to as the dV/dt signal 509. The differentiation element 501 produces a positive derivative signal (dV/dt pos) 504 indicative of the dV/dt signal 509 being greater than a positive threshold 552. The differentiation element 501 also produces a negative derivative signal (dV/dt neg) 505 indicative of the dV/dt signal 509 being less than a negative threshold 554. Example positive and negative derivative signals are shown in FIG. 3 as curves 304, 305 respectively, and in FIG. 4 as curves 404, 405.

The steady state detector 502 receives the positive derivative signal 504 and negative derivative signal 505 generated by the differentiation element 501 and produces as an output a zero derivative signal 507 (referred to as 'a No dV/dt' in FIGS. 3 to 5). When the received positive derivative signal 504 and negative derivative signal 505 are representative of the differential of the Vdrain signal 503 being between the positive threshold 552 and negative threshold 554 for a minimum period of time, the zero derivative signal 507 is set. The zero derivative signal 507 is plotted in FIG. 3 as curve 307 and in FIG. 4 as curve 407. The zero derivative signal 504 can be considered as providing an indication of when the rate of change of the voltage at the drain of the switching transistor is substantially equal to zero.

The logic arrangement 513 receives the negative derivative signal 505 and the zero derivative signal 507 as inputs and generates an end of demagnetization indicator 508 as an output when the dV/dt signal 509 changes from being substantially equal to zero to being negative. In this example the end of the demagnetization indicator 508 is set to be a short pulse when the end of demagnetization is detected.

In the embodiment of FIG. 5 the differentiation element 501 comprises a serial capacitor 510 with a first plate coupled to the drain of the power transistor of the flyback converter. The capacitor 510 acts as a high pass filter and can be considered as a differentiator. The output of the capacitor 510, at its second plate, is a current which represents the rate of change of Vdrain with respect to time.

In the embodiment of the differentiation element 501 shown in FIG. 5 the second plate of the capacitor 510 is coupled to a current to voltage (I to V) convertor 512 and provides the current from the second plate of the capacitor 510 to the I to V converter 512. The output signal 509 of the current to voltage convertor 512 is a voltage representation of the rate of change of Vdrain with respect to time; that is the dV/dt signal 509.

However, it will be appreciated that the I to V convertor 512 is not necessary in all embodiments as various components of the differentiation element 501 may be configured to add and compare currents, instead of voltages. In embodiments without a I to V convertor 512, the dV/dt signal may be considered to be the output from the second plate of the capacitor 510. Components configured to act on currents may be analogous to those that act on voltage signals and the necessary alterations to FIG. 5 that would be required for a differentiation element for processing currents will be readily apparent to those skilled in the art.

The dV/dt signal 509 is provided as an input to an adder 514 (which in the voltage case is a voltage adder 514) along with a reference signal 556 (which in the voltage case is a reference voltage signal 556 from a DC reference voltage source 516). The adder 514 outputs a dV/dt ref signal 517, which is representative of the dV/dt signal 509 shifted by a fixed reference value.

The differentiation element 501 also comprises a positive signal differential amplifier 518 and a negative signal differential amplifier 520. The dV/dt ref signal 517 is provided to the inverting input of both the positive signal differential amplifier 518 and the negative signal differential amplifier 520.

The differentiation element 501 also includes a positive threshold setting component 522 that adds an offset to the reference level in order to provide a signal representative of the positive threshold to the positive differential amplifier 518, this signal will be referred to as ref1 552 (or vref1 552 for the voltage case). Similarly, the reference voltage signal 556 is provided to a negative threshold setting component 524 that subtracts an offset from the reference level in order to provide a signal representative of the negative threshold to the negative differential amplifier 520, this signal will be referred to as ref1 552 (or vref2 554 for the voltage case). The dV/dt ref signal 417, vref1 452 and vref2 454 signals are shown in FIG. 4.

The magnitude of the offsets applied by the positive and negative threshold setting components 522, 524 may or may not be the same. With reference to FIG. 4, it will be appreciated that varying the size of the offsets will change the distances between the horizontal axis and the threshold levels 452, 454.

The output of the positive differential amplifier 518 is set when the dV/dt ref signal 517 is above vref1 552, and this output will be referred to as dV/dt pos 504. The output of the negative differential amplifier 520 is set when the dV/dt ref signal 517 is below vref2 554, and this output will be referred to as dV/dt neg 505.

The steady state detector 502 includes a first discharge switch 532 that is closed when dV/dt neg 505 is high and opened when dV/dt neg 505 is low. Similarly, the steady state detector 502 includes a second discharge switch 530 that is closed when dV/dt pos 504 is high and opened when dV/dt pos 504 is low.

A first terminal of both the first and second discharge switches 532, 530 is coupled to ground. A second terminal of both the first and second discharge switches 532, 530 is coupled to the first plate of a timing capacitor 528. The second plate of the timing capacitor 528 is also connected to ground. The first plate of the timing capacitor 528 is also connected to constant DC current source 534, referred to in FIG. 5 as Iref, via a secondary stroke switch 536. The secondary stroke switch 536 is controlled such that it is closed during the secondary stroke and opened during the primary stroke. In this way, the constant current source 536 is coupled to the first plate of the timing capacitor 528 only during the secondary stroke. When both the dV/dt neg signal 505 and dV/dt pos signal 504 are low, and therefore the associated discharge switches 532, 530 are open, the constant current source 536 linearly increases the charge stored across the timing capacitor 528. When either of the dV/dt neg signal 505 or dV/dt pos signal 504 are high, and therefore the associated discharge switches 532, 530 are closed, the timing capacitor 528 is discharged to ground via the closed discharge switch 532, 530 and the charge stored across the timing capacitor 528 falls to zero.

Charging of the timing capacitor 528 and subsequent operation of the circuit of FIG. 5 will now be described with reference to the waveforms of FIG. 4 along with the circuit of FIG. 5. It will be appreciated that the waveforms illustrated in FIG. 4 occur during the secondary stroke and therefore the secondary stroke switch 536 will be closed for the entire time that is illustrated in FIG. 4.

The dV/dt ref signal 417, dV/dt pos signal 404 and dV/dt neg signal 405 in FIG. 4 all start at zero. The dV/dt ref signal 417 then crosses the positive threshold level 452. When this positive threshold 452 is exceeded, dV/dt pos 404 is set high, which causes the second discharge switch 530 to be closed and the timing capacitor 528 to be discharged. The dV/dt ref signal 417 then stays high until it drops below the positive threshold level 452, at which point the dV/dt pos signal 404 is set low and the second discharge switch 530 is opened. At this time, both the first and second discharge switches 532, 530 are opened, there is no discharge path for the timing capacitor 528, and therefore the charge starts to build up on the timing capacitor 528. This is shown in FIG. 4 by the Charge cap signal 407 starting to linearly increase when dV/dt pos 404 drops to zero.

The dV/dt ref signal 417 then stays between the positive threshold level 452 and the negative threshold level 454 for a period of time identified with reference 410 in FIG. 4, after which the dV/dt ref signal 417 drops below the negative threshold level 454. When the dV/dt ref signal 417 drops below the negative threshold level 454, the dV/dt neg signal 405 is set. This causes the first discharge switch 532 to be closed and the timing capacitor 528 to be discharged to ground. The reduction in charge across the timing capacitor 528 is evident from the Charge cap signal 407 in FIG. 4.

The dV/dt ref signal 417 then continues to oscillate, and periodically exceed the positive threshold level 452 and negative threshold level 454 during the ringing in the drain voltage at the start of the secondary stroke. It can be seen from FIG. 4 that the amplitude of the oscillations in the dV/dt ref signal 417 decrease over time, which leads to an increase in the time that the dV/dt ref signal 417 is between the positive and negative threshold levels 452, 454 for each oscillation. This in turn causes the charge on the timing capacitor 528 to reach a higher value before it is reset to zero, as illustrated by the Charge cap signal 407 in FIG. 4.

After a number of oscillations (three oscillations in the example of FIG. 4), the amplitude of the oscillations in the dV/dt ref signal 417 does not exceed either the positive threshold level 452 or the negative threshold level 454. Therefore, the timing capacitor 528 is not discharged for each oscillation and the Charge cap signal 406 continues to linearly increase.

The Charge cap signal 406 reaches a timing threshold level 427 after a predetermined period of time. This predetermined period of time represents a minimum period of time for which the dV/dt signal 409 should be between the positive and negative threshold levels 452, 454 in order for the initial ringing at the start of the secondary stroke to be considered as over. When the Charge cap signal 406 exceeds the timing threshold level 427, a No dV/dt signal 407 is set. This functionality is performed by a differential amplifier 526 in FIG. 5.

The non-inverting input of the differential amplifier 526 in FIG. 5 is coupled to the first plate of the timing capacitor 528. The inverting input of the differential amplifier 526 is coupled to a DC voltage source 527 that provides a signal indicative of the timing threshold level. The output of the differential amplifier 526 is the No dV/dt signal 507, which is shown with reference 407 in FIG. 4.

The logic arrangement 513 receives the negative derivative signal 505 from the differentiation element 501 and the no dV/dt signal 507 from the steady state detector 502. The logic arrangement 513 comprises a delay element 538 that receives the no dV/dt signal 507 as an input. The delay element 538 applies a delay to the zero derivative signal 507, and provides a delayed no dV/dt signal 537. The delayed no dV/dt signal 437 is also shown in FIG. 4.

The delay element 538 may comprise, for example, a chain comprising an even number of NOT gates. Each NOT gate, or other functional unit has an intrinsic propagation delay. Providing many such delays in series can lead to a substantive delay in the signal to be propagated.

The delayed no dV/dt signal 537 is provided as an input to an OR gate 540 along with the no dV/dt signal 507. The output of the OR gate 540 is a No dV/dt extended signal 541, which is also shown in FIG. 4 with reference 441. The No dV/dt extended signal 541 is set high when the No dV/dt signal 507 goes high and remains high until the delayed no dV/dt signal 537 goes low. The No dV/dt extended signal 541 can be considered as being an extended version of the No dV/dt signal by a period of time equivalent to the length of the delay that is applied by the delay component 538. As will be appreciated from the description that follows, the length of the delay corresponds to the length of the pulse in the End of demag detection signal 508.

The logic arrangement 513 includes an AND gate 542 that receives the No dV/dt extended signal 541 as a first input and the dV/dt neg signal 505 as a second input. The output of the AND gate 542 is the End of demag detection signal 508. As can be seen from the waveforms in FIG. 4, the End of demag detection signal 408 consists of a pulse that starts when the dV/dt signal 409 first drops below the negative threshold 454 after the No dV/dt signal 407 has been set. That is, the End of demag detection signal 508 is set when the dV/dt signal 409 crosses a final threshold value (which in this example is the same as the negative threshold value, although this need not be the case as a different final threshold value could be used) after the No dV/dt signal 507 has been set.

In this example, the pulse in the End of demag detection signal 408 ends when the No dV/dt extended signal 441 falls to zero. It is known that a demagnetization stroke ends when the voltage at the drain of the switching transistor falls away from its average value, and therefore the start of the pulse in the End of demag detection signal 408 can be considered as a good approximation of the end of the demagnetization stroke.

It will be appreciated that in some examples a similar circuit could be provided that does not require the calculation or use of the dV/dt pos signal 504. That is, an embodiment of the invention can have a differentiation element only calculates a dV/dt neg output signal representative of the dV/dt signal being less than a negative threshold value. The steady state detector may only discharge the timing capacitor when the dV/dt signal is set, which may require the value for the predetermined time (as set by Vth 527 in FIG. 5) to be adjusted. In such an example, no changes would be required to the logic arrangement 513 of FIG. 5 as it can be assumed that the end of the demagnetization stroke always occurs when the dV/dt signal goes negative.

This operation may enable a controller to accurately determine the level of the output, using an accurate measurement of the duration of the secondary stroke, such that an output current/voltage can be maintained within a very precise range. The time when there is no more current in the secondary winding corresponds to a change of dV/dt status (i.e. zero to negative). The precise detection of the end of the secondary stroke can be achieved as such a controller is able to distinguish between the expected dV/dt change due to the end of the secondary stroke and those related to ringing oscillations at the start of the secondary stroke.

Figure 6:
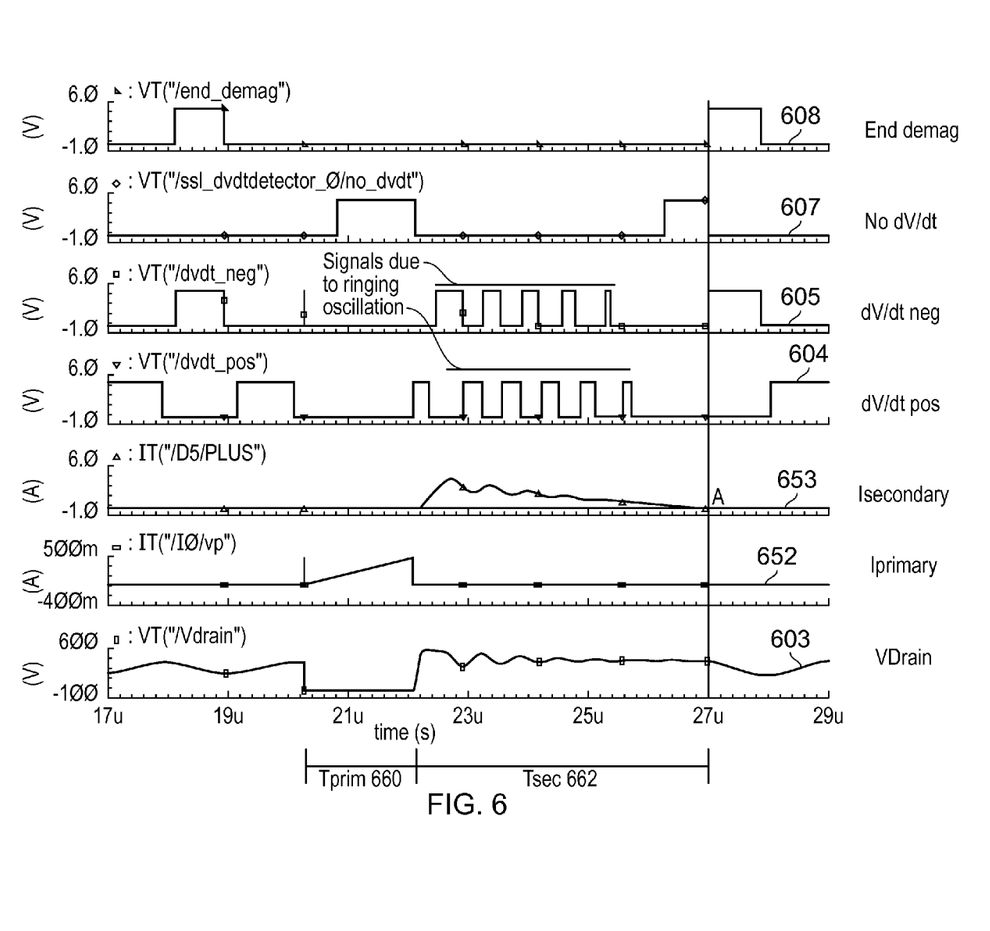
FIG. 6 shows signal profiles generated by computer models of circuits in accordance with the present invention.
Figure 7:
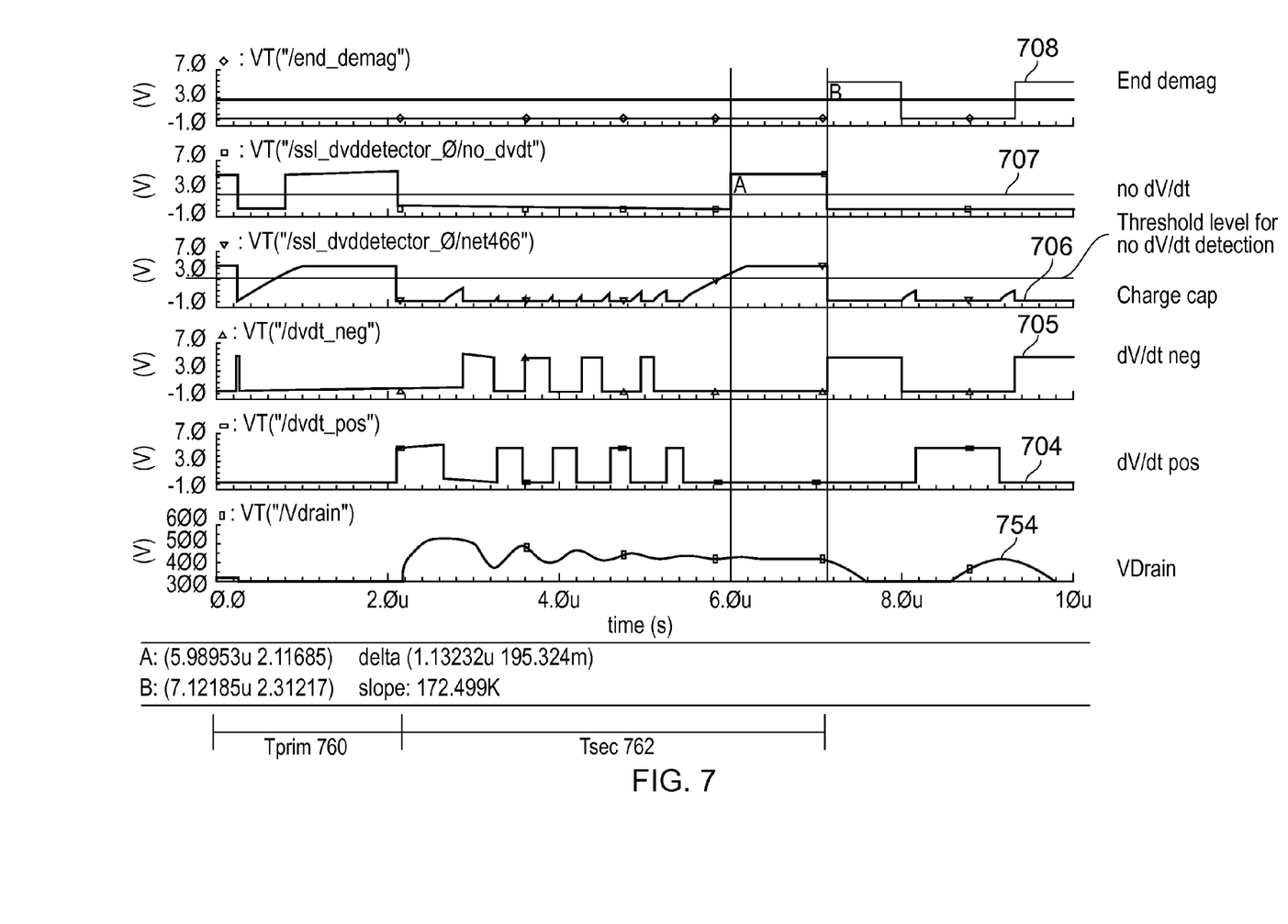
FIG. 7 shows signal profiles generated by computer models of circuits in accordance with the present invention.

FIGS. 6 and 7 show simulation results for the circuit of FIG. 5. FIGS. 6 and 7 show signals within the circuit of FIG. 5 that are discussed above, with corresponding reference numbers in the 600 and 700 series.

Figure 8:
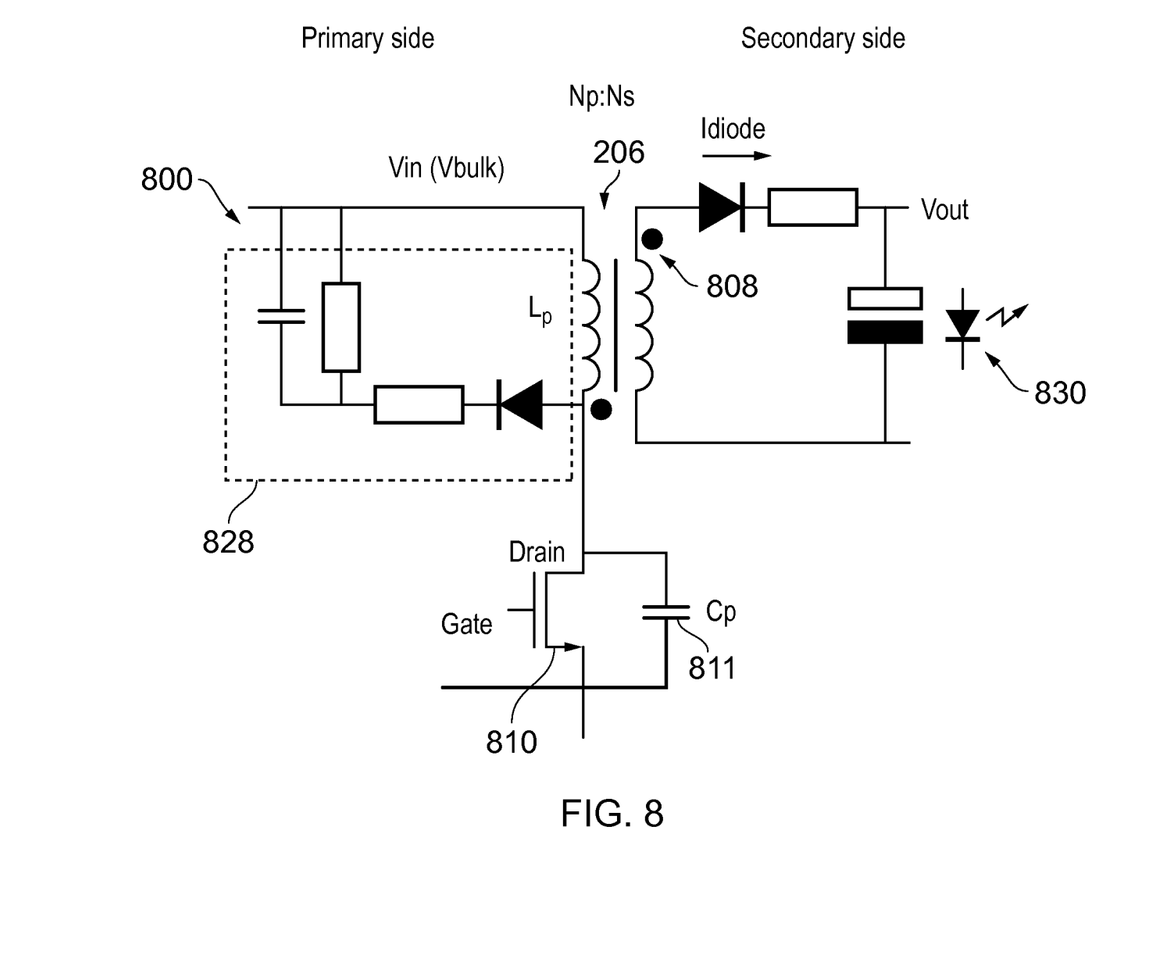
FIG. 8 shows a circuit diagram of a flyback converter with a snubber circuit that can be used with embodiments of the invention.

FIG. 8 shows a circuit diagram of a flyback converter 800 that can be used with embodiments of the invention. The circuit of FIG. 8 is suitable for providing power to one or more LEDs as represented by the LED 830 in the drawing. The configuration of the flyback converter 800 is similar to the converter 100 in FIG. 1. The switching transistor 810 is shown with a parasitic capacitance Cp 811 in parallel with the source and drain terminals of the switching transistor 810.

The primary side of the transformer has a snubber circuit 828 as is known in the art. The snubber circuit 828 can help to reduce the oscillations in the drain voltage caused by parasitic capacitances and leakage currents. In some applications it may be preferable not to use a snubber circuit. In such cases, the damping that would be provided by the snubber circuit is absent and so the duration of ringing oscillations is longer. If a fixed blanking time is applied to such a system, an issue can occur because ringing oscillations could be interpreted as an end of demagnetization. Embodiments of the present invention may solve this issue in switch mode power supplies implemented without a snubber circuit.

A controller in accordance with an embodiment of the present invention can use information on the duration of the secondary stroke (the demagnetization period) to accurately determine the output current of the transformer.

It will be appreciated to the skilled person that there are various equivalent methods or arrangements of components that can be used to implement the functionality of present invention. The circuits, diagrams and signal profiles disclosed herein represent non-limiting example of how embodiments of the invention can be implemented.

Embodiments of the present invention may be used in combination with any switched mode power supply (SMPS) where energy is stored in a winding, inductor or transformer during the primary stroke and transferred to the output during the secondary stroke. Examples of such SMPS include a flyback converter, a Buck converter and a Buck boost converter.

Such embodiments may be configured to use a negative dV/dt signal and/or a positive dV/dt signal to distinguish between ringing oscillations at the start of the secondary stroke and the oscillations that signify the end of the secondary stroke.

Embodiments of the invention can be applied in switch mode power supplies with mains isolation when it is preferable not to use an opto-coupler for output voltage regulation. For example, embodiments of the present invention may provide particular advantages in Low power adapters or LED drivers.

Some advantages of embodiments of the present invention include:

Improved ease of implementation compared with prior art devices. Output current accuracy can be monitored internally within an IC housing an embodiment of the invention, without the need for external components such as an opto-coupler. This can reduce component costs.

A one pin saving can be achieved on the IC package. There is no need to provide a feedback signal from an auxiliary winding of a power supply transformer as a dV/dt detector in accordance with an embodiment of the present invention can be directly connected to the drain of a power transistor of a power supply, Embodiments of the present invention may be compatible with Buck and flyback converters.

A reduction in the required suppression of oscillations that is provided by a snubber circuit. Therefore, smaller and/or less expensive components can be used for snubber circuits used in combination with embodiments of the present invention.

A controller or circuit in accordance with an embodiment of the present invention can identify the end of a demagnetization period as a change in the derivative value (rate of change with respect to time) of a signal representative of a voltage across a winding in a SMPS from a value broadly equal to zero to a negative value, after the derivative value has been broadly equal to zero for a minimum period of time. Broadly equal to zero may be construed as within one or more threshold values relative to zero. Using the minimum period of time can be considered as applying 'adaptive blanking' in order to ignore the initial ringing oscillations at the start of the secondary stroke. The adaptive blanking is not related to a predetermined or fixed period and time and can allow good flexibility in design and use of the controller.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A circuit for a switched mode power supply having a winding, the circuit comprising:
   an input configured to receive a winding voltage derived from the winding;
   a differentiation element configured to differentiate the winding voltage with respect to time in order to determine a derivative signal and compare the derivative signal with a threshold value;
   a steady state detector configured to set a zero derivative signal when the derivative signal has not exceeded the threshold value for a predetermined period of time, and
   a logic arrangement configured to identify an end of a demagnetization stroke of the switched mode power supply when the derivative signal crosses a final threshold value after the zero derivative signal has been set.

2. The circuit of claim 1, wherein the switched mode power supply is a flyback converter and the winding is a winding at a primary side of a flyback transformer.

3. The circuit of claim 2, wherein the winding voltage is the voltage at the drain of a power switch of the flyback converter.

4. The circuit of claim 1 wherein the final threshold value is the same as the threshold value.

5. The circuit of claim 1, wherein the threshold value is a negative threshold value, and the differentiation element is further configured to compare the derivative signal with a positive threshold value; and
   the steady state detector is configured to set the zero derivative signal when the derivative signal has been between the negative threshold value and the positive threshold value for the predetermined period of time.

6. The circuit of claim 5, wherein the differentiation element is further configured to:
   set a positive derivative signal when the derivative signal is greater than the positive threshold value;
   reset the positive derivative signal when the derivative signal is less than the positive threshold value;
   set a negative derivative signal when the derivative signal is less than the negative threshold value; and
   reset the negative derivative signal when the derivative signal is greater than the negative threshold value.

7. The circuit of claim 1, wherein the steady state detector comprises:
   a timing capacitor that is configured to be charged whilst the derivative signal does not exceed the threshold value and discharged whilst the derivative signal does exceed the threshold value; and
   a comparator configured to compare the voltage across the timing capacitor with a timing threshold level, wherein the output of the comparator is the zero derivative signal.

8. The circuit of claim 1, wherein the logic arrangement is configured to:
   set an end of demagnetization indicator when the derivative signal crosses the final threshold value after the zero derivative signal has been set; and
   reset the end of demagnetization indicator upon expiry of a delay interval after the end of demagnetization indicator is set.

9. The circuit of claim 8, wherein the logic arrangement is configured to:
   receive the zero derivative signal and provide a delayed zero derivative signal;
   perform a logical AND operation on the negative derivative signal and the delayed zero derivative signal in order to generate the end of demagnetization indicator.

10. A controller for controlling a switch in a switched mode power supply, the controller configured to:

determine a total period of a switching cycle;
determine the start of a demagnetization period;
identify the end of demagnetization period using the circuit of any preceding claim;
determine a duration of the demagnetization period;
calculate an output current in accordance with:
- the duration of the total period of the switching cycle,
- a peak current flowing through the winding; and
- the duration of the demagnetization period; and activate the switch for a subsequent switching cycle in accordance with the calculated output current.

11. A method of operating a circuit for a switched mode power supply having a winding, the method comprising:
receiving a winding voltage derived from the winding;
differentiating the winding voltage with respect to time in order to determine a derivative signal;
comparing the derivative signal with a threshold value;
setting a zero derivative signal when the derivative signal has not exceeded the threshold value for a predetermined interval of time;
identifying an end of a demagnetization stroke of the switched mode power supply when the derivative signal crosses a final threshold value after the zero derivative signal has been set.

12. A method for controlling a switch in a switched mode power supply comprising a winding, the method comprising:
determining a total period of a switching cycle;
determining the start of a demagnetization period;
identifying an end of the demagnetization stroke according to the method of claim 11;
calculating an output current over the total period in accordance with:
- the duration of the total period of the switching cycle,
- a peak current flowing through the winding; and
- the duration of the demagnetization period; and activating the switch for a subsequent switching cycle in accordance with the calculated output current.

* * * * *